United States Patent Office 3,134,770
Patented May 26, 1964

3,134,770
ACETALS AND KETALS OF 16,17-DIHYDROXY STEROIDS OF THE PREGNENE SERIES
Josef Fried, Princeton, N.J., assignor to Olin Mathieson Chemical Corporation, New York, N.Y., a corporation of Virginia
No Drawing. Filed Nov. 7, 1961, Ser. No. 150,623
14 Claims. (Cl. 260—239.55)

This invention relates to, and has for its objects the provisions of new physiologoically active steroids, methods for preparing the same, and intermediates useful in such preparations.

The final products of this invention are steroids which are 16,17-acetal and ketal derivatives of 16α,17α,20β-trihydroxy-4-pregnene steroids, and include steroids of the general formula

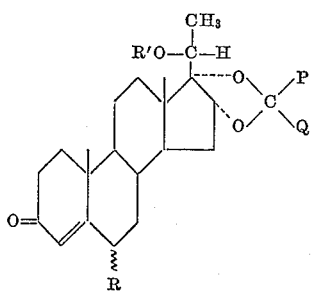

wherein R is in either the alpha or beta position and represents hydrogen, halogen (preferably chloro and fluoro), or lower alkyl; R' is hydrogen or the acyl radical of a hydrocarbon carboxylic acid of less than ten carbon atoms; P is hydrogen, lower alkyl, halo lower alkyl, monocyclic cycloalkyl, monocyclic cycloalkyl lower alkyl, monocyclic aryl, monocyclic aryl lower alkyl, monocyclic heterocyclic or monocyclic heterocyclic lower alkyl; Q is lower alkyl, halo lower alkyl, monocyclic cycloalkyl, monocyclic cycloalkyl lower alkyl, monocyclic aryl, monocyclic aryl lower alkyl, monocyclic heterocyclic or monocyclic heterocyclic lower alkyl; or together with the carbon to which they are joined P and Q is a monocyclic cycloalkyl or monocyclic heterocyclic radical.

The final products of this invention are physiologically-active substances which posses progestational activity when administered both in the form of tablets and as a solution or suspension and hence can be used in lieu of known progestational agents, such as progesterone, in the treatment of habitual abortion. For this purpose, they can be administered in the same manner as progesterone, for example, the dosage being adjusted for the relative potency of the particular steroid. The compounds of this invention can also be administered perorally in the form of tablets.

In accordance with one process of this invention, the compounds of this invention can be prepared by reacting a compound of the formula

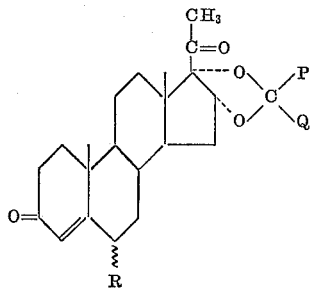

wherein R (in either the alpha or beta position), P and Q are as hereinbefore defined, with a lower alkanediol (e.g., ethylene glycol, propylene glycol) to yield the new 3-ketals of this invention of the formula

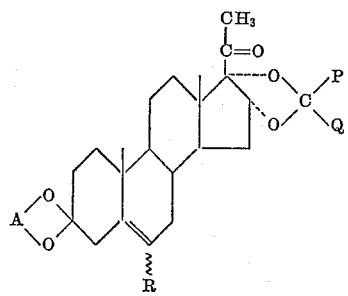

wherein R, P and Q are as hereinbefore defined and A is a lower alkylene radical, preferably ethylene. The reaction is preferably conducted in an organic solvent for the steroid reactant at an elevated temperature, preferably the reflux temperature of the solvent, in the presence of an acid catalyst, such as p-toluenesulfonic acid.

The resulting 3-ketal is then reduced, as by treatment with lithium aluminum hydride or a borohydride (e.g., sodium borohydride and lithium borohydride) to yield the new 3-ketal-20β-hydroxy intermediates of this invention of the formula

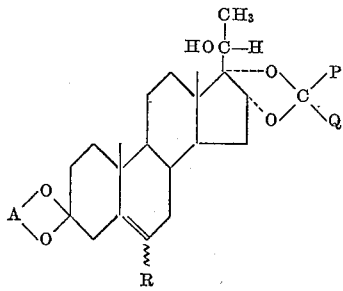

wherein R, P, Q and A are as hereinbefore defined. This reaction is preferably carried out at an elevated temperature, such as the reflux temperature of the solvent used to dissolve the steroid reactant.

The 3-ketal-20β-hydroxy compounds are then hydrolized, as by treatment with a dilute acid, such as a dilute mineral acid as exemplified by dilute sulfuric acid, to yield the final products of this invention wherein R is in the alpha position.

The final products of this invention can also be prepared from the same starting materials by a second process of this invention, wherein the starting steroid is reduced by treatment with lithium aluminum hydride or a borohydride without protection of the 3-keto group. In this event both the 3-keto and the 20-keto groups are reduced, yielding new 3β,20β-dihydroxy intermediates of this invention of the formula

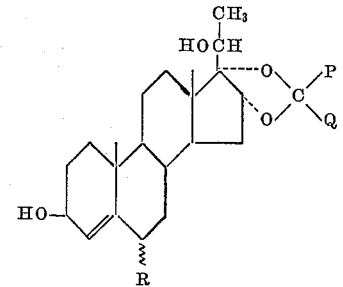

wherein R, P and Q are as hereinbefore defined.

These intermediates are then selectively oxidized by treatment with manganese dioxide to yield the final 3-keto-20β-hydroxy compounds of this invention.

Among the suitable initial steroid reactants may be mentioned the 16,17-acetals and ketals of each of the following steroids with one of the aldehydes or ketones listed hereinafter: 16α,17α - dihydroxyprogesterone; 6-halo - 16α,17α-dihydroxyprogesterones, such as 6α-fluoro-16α,17α - dihydroxyprogesterone, 6β-fluoro-16α,17α-dihydroxyprogesterone, 6α - chloro - 16α,17α-dihydroxyprogesterone, 6β - chloro - 16α,17α-dihydroxyprogesterone, 6α - bromo - 16α,17α - dihydroxyprogesterone and 6β - bromo - 16α,17α-dihydroxyprogesterone; and 6 - (lower alkyl) - 16α,17α - dihydroxyprogesterones, such as 6α - methyl - 16α,17α - dihydroxyprogesterone, 6β - methyl - 16α,17α - dihydroxyprogesterone and 6α-ethyl-16α17α-dihydroxyprogesterone.

Suitable aldehydes and ketones include lower alkanals of at least two carbon atoms, such as paraldehyde, propanal and hexanal; di(lower alkyl)ketones, such as acetone, diethylketone, dibutyl-ketone, methylethylketone, and methylisobutylketone; cycloalkanones, such as cyclobutanone, cyclopentanone, cyclohexanone, suberone, and cyclodecanone; cycloalkyl (lower alkanals), such as cyclopropylcarboxaldehyde, cyclobutylcarboxaldehyde, cyclopentylcarboxaldehyde cyclohexylcarboxaldehyde, cycloheptylcarboxaldehyde, cyclooctylcarboxaldehyde, cyclopropylacetaldehyde, cyclobutylacetaldehyde, cyclopentylacetaldehyde, cyclohexylacetaldehyde, β - cyclopentylpropionaldehyde, γ - cyclohexylbutyraldehyde, and 3 - cyclopropylcarproaldehyde; cycloalkyl(lower alkanones), such as cyclopropyl methyl ketone, cyclobutyl ethyl ketone, cyclopentyl propyl ketone, cyclopentylmethyl methyl ketone, cyclohexylmethyl ethyl ketone, cyclopentylethyl ethyl ketone, cyclopropylpropyl methyl ketone, cyclohexyl n-pentyl ketone, cyclohexyl methyl ketone, and cyclooctyl methyl ketone; dicycloalkyl ketones, such as dicyclopropyl ketone, dicyclobutyl ketone, dicyclopentyl ketone, dicyclohexyl ketone, cyclopentyl cyclohexyl ketone, cyclopropylmethyl cyclopropyl ketone, 2-cyclobutylethyl cyclopropyl ketone, 3-cyclopentylmethyl cyclopentyl ketone, 5-cyclohexylhexyl cyclohexyl ketone, di(cyclopentylmethyl)ketone, cyclohexylmethyl cyclopentyl ketone, and di(4-cyclohexylpentyl)ketone; cycloalkyl monocyclic aromatic ketones, such as cyclopropyl phenyl ketone, cyclohexyl p-chlorophenyl ketone, cyclopentyl o-methoxyphenyl ketone, cyclopentyl o,p-dihydroxyphenyl ketone, cyclohexyl m-tolyl ketone, cyclopropyl p-ethylphenyl ketone cyclopropyl p-nitrophenyl ketone, and cyclohexyl p-acetamidophenyl ketone; cycloalkyl(lower alkyl) monocyclic aromatic ketones, such as cyclopentylmethyl phenyl ketone; cycloalkyl monocyclic aromatic (lower alkyl) ketones, such as cyclopentyl benzyl ketone, cyclohexyl phenethyl ketone, and cyclobutyl benzyl ketone; cycloalkyl(lower alkyl) monocyclic aromatic (lower alkyl) ketones, such as cyclopentylmethyl benzyl ketones; cycloalkyl monocyclic heterocyclic ketones, such as cyclopentyl 2-furyl ketone, cyclohexyl 2-thienyl ketone, and cyclopropyl 2-pyridinyl ketone; cycloalkyl (lower alkyl) monocyclic heterocyclic ketones, such as cyclopentylmethyl 2-piperidinyl ketone, cyclohexylethyl 2-morpholinyl ketone and cyclopropyl 2-thienyl ketone; cycloalkyl monocyclic heterocyclic (lower alkyl) ketones, such as cyclopentyl thenyl ketone, cyclohexyl furfuryl ketone and cyclopropyl 2-piperidinylmethyl ketone; halo-lower alkanals, such as chloral hydrate, trifluoroacetaldehyde hemiacetal, and heptafluorobutanal ethyl hemiacetal; halo-lower alkanones, such as 1,1,1-trifluoroacetone; monocyclic carbocyclic aromatic aldehydes, such as benzaldehyde, halobenzaldehydes (e.g. p-chlorobenzaldehyde and p-fluorobenzaldehyde), lower alkoxybenzaldehydes (e.g. o - anisaldehyde), di(lower alkoxy) benzaldheydes (e.g., veratraldehyde), hydroxybenzaldehydes (e.g. salicylaldehyde), dihydroxybenzaldehydes (e.g. resorcyaldehyde), lower alkyl benzaldehydes (e.g. m-tolualdehyde and p-ethylbenzaldehyde), di(lower alkyl)benzaldehydes (e.g., o-p-dimethylbenzaldehyde), nitrobenzaldehydes, acylamidobenzaldehydes (e.g. N-acetylanthranilaldehyde), and cyanobenzaldehydes; monocyclic carboxylic aromatic lower alkanals, such as phenylacetaldehyde, α - phenylpropionaldehyde, β - phenylpropionaldehyde, γ - phenylbutyraldehyde, and aromatically-substituted halo lower alkoxy, hydroxy, lower alkyl, nitro, acylamido and cyano derivatives thereof; monocyclic heterocyclic aldehydes, such as picolinaldehydes, furfural, thiophene carbonals, and halo, lower alkoxy, hydroxy, lower alkyl, nitro, and cyano derivatives thereof; monocyclic heterocyclic lower alkanals; monocyclic carbocyclic aromatic ketones, such as acetophenone, α,α,α - trifluoroacetophenone, propiophenone, butyrophenone, valerophenone, isocaprophenone, halophenyl lower alkyl ketones (e.g. p-chloroacetophenone and p-chloropropiophenone), (lower alkoxy) phenyl lower alkyl ketones (e.g. p-anisyl methyl ketone), di-(lower alkoxy)phenyl lower alkyl ketones, hydroxy-phenyl lower alkyl ketones, dihydroxyphenyl lower alkyl ketones (e.g. resacetophenone), (lower alkyl)phenyl lower alkyl ketones (e.g. methyl p-tolyl ketone), di(lower alkyl) phenyl lower alkyl ketones (o,p-xylyl methyl ketone), nitrophenyl lower alkyl ketones (e.g. p-nitroacetophenone), acylamidophenyl lower alkyl ketones (e.g., acetyl anilines), and cyano phenyl lower alkyl ketones; benzophenone, and mono or bis substituted halo, lower alkoxy, hydroxy, lower alkyl, nitro, acylamido and cyano derivatives thereof; monocyclic carbocyclic aromatic lower alkanones, such as 1-phenyl-3-butanone and 1-phenyl-4-pentanone, and aromatically substituted derivatives thereof; monocyclic heterocyclic ketones, such as 2-acetylfuran, 2-benzoylfuran, 2-acetyl-thiophene and alloxan; and monocyclic heterocyclic lower alkanones.

The following examples illustrate the invention (all temperatures being in centigrade):

EXAMPLE 1

*16α,17α-Dihydroxyprogesterone 16α,17α-Acetonide 3-Monoethylene Ketal*

To a solution of 1 g. of 16α,17α-dihydroxyprogesterone acetonide in 50 ml. of benzene and 10 ml. of ethylene glycol is added 20 mg. of p-toluene-sulfonic acid monohydrate and the mixture is refluxed for 20 hours using a Dean-Stark phase separator. Sodium bicarbonate solution is added to the cooled mixture which is then washed with water and the benzene phase dried over sodium sulfate and evaporated to dryness in vacuo. Crystallization of the crude residue from acetone-hexane yields about 625 mg. (56% yield) of 16α,17α-dihydroxyprogesterone 16α,17α-acetonide 3-monoethylene ketal, M.P. about 190–195° C. Recrystallization from acetone yields the analytically pure monoketal with the following properties: M.P. about 201–203° C.; $[\alpha]_D^{23}$ +11.7° (c., 1.2 in chlf.);

$\lambda_{max.}^{Nujol}$ 5.82μ no selective U.V. absorption.

EXAMPLE 2

*16α,17α-Dihydroxyprogesterone 16α,17α-Acetophenonide 3-Monoethylene Ketal*

To a solution of 1 g. of 16α,17α-dihydroxyprogesterone acetophenonide, M.P. about 150–152°, in 50 ml. of benzene and 10 ml. of ethylene glycol is added 20 mg. of p-toluene-sulfonic acid monohydrate and the mixture refluxed for 65 hours using a Dean-Stark phase separator. Sodium bicarbonate solution is added to the cooled mixture which is then washed with water and the benzene solution dried over sodium sulfate and evaporated to dryness in vacuo. Crystallization of the crude residue from 95% ethanol yields about 430 mg. of 16α,17α-dihydroxyprogesterone 16,17-acetophenonide 3-ethylene ketal, M.P. about 173–179° C. Recrystallization from ethanol-methanol gives the analytically pure ketal with the following properties.
M.P. about 184–186° C.; $[\alpha]_D^{23}$ —45.0° (c., 1.0 in chlf.)

$\lambda_{max.}^{Nujol}$ 5.83, 12.95 and 13.20$\mu$ no selective U.V. absorption.

*Anal.*—Calcd. for $C_{31}H_{40}O_5$ (492): C, 75.58; H, 8.18. Found: C, 75.34; H, 8.36.

Similarly, if propylene glycol is substituted for the ethylene glycol in the procedures of Examples 1 and 2, the corresponding 3-monopropylene ketals are formed.

EXAMPLE 3

*16α,17α-Choral Derivative of Δ$^4$-Pregnene-16α,17α-Diol-3,20-Dione 3-Ethylene Ketal*

Following the procedure of Example 1 but substituting an equivalent amount of the 16α,17α-chloral derivative of 16α,17α-dihydroxyprogesterone for the 16α,17α-dihydroxyprogesterone 16,17-acetonide, the 16α,17α-chloral derivative of Δ$^4$-pregnene-16α,17α-diol-3,20-dione 3-ethylene ketal is obtained.

EXAMPLE 4

*16,17-Dicyclopropyl Ketone Derivative of Δ$^4$-Pregnene-16α,17α-Diol-3,20-Dione 3-Ethylene Ketal*

Following the procedure of Example 1 but substituting an equivalent amount of the 16α,17α-dicyclopropyl ketone derivative of 16α,17α-dihydroxyprogesterone for the 16α,17α-dihydroxyprogesterone 16,17-acetonide, the dicyclopropyl ketone derivative of Δ$^4$-pregnene-16α,17α-diol 3-ethylene ketal is obtained.

Similarly, the methylisobutyl ketone derivative, the cyclopropyl phenyl ketone derivative, the cyclohexyl methyl ketone derivative, the 1,1,1-trifluoroacetonide derivative, heptafluorobutanal derivative, the p-chloroacetophenone derivative, the p-nitroacetophenone derivative, the benzaldehyde derivative, the furfural derivative, the benzophenone derivative and the 2-acetylfuran derivative of 16α,17α-dihydroxyprogesterone, yield the methylisobutyl ketone, the cyclopropyl phenyl ketone, the cyclohexyl methyl ketone, the 1,1,1-trifluoroacetonide, the heptafluorobutanal, the p-chloroacetophenone, the p-nitroacetophenone, the benzaldehyde, the furfural, the benzophenone and the 2-acetylfuran derivatives of Δ$^4$-pregnene-16α,17α-diol-3,20-dione 3-ethylene ketal respectively.

EXAMPLE 5

*6-Chloro-Δ$^5$-Pregnene-16α,17α-Diol-3,20-Dione 16,17-Acetonide 3-Ethylene Ketal*

Following the procedure of Example 1 but substituting an equivalent amount of 6β-chloro-Δ$^4$-pregnene-16α,17α-diol-3,20-dione 16,17-acetonide for the 16α,17α-dihydroxyprogesterone 16,17-acetonide, 6-chloro-Δ$^5$-pregnene-16α,17α-diol-3,20-dione 16α,17α-acetonide 3-ethylene ketal is obtained.

EXAMPLE 6

*6-Chloro-Δ$^5$-Pregnene-16α,17α-Diol-3,20-Dione 16,17-Acetonide 3-Ethylene Ketal*

Following the procedure of Example 1, but substituting 6α-chloro-16α,17α-dihydroxyprogesterone 16,17-acetonide for the 16α,17α-dihydroxyprogesterone 16,17-acetonide, 6-chloro-Δ$^5$-pregnene-16α,17α-diol-3,20-dione 16,17-acetonide 3-ethylene ketal is obtained.

EXAMPLE 7

*6-Fluoro-Δ$^5$-Pregnene-16α,17α-Diol-3,20-Dione 16,17-Acetonide 3-Ethylene Ketal*

Following the procedure of Example 1, but substituting 6β-fluoro-16α,17α-dihydroxyprogesterone 16,17-acetonide for the 16α,17α-dihydroxyprogesterone 16,17-acetonide, 6-fluoro-Δ$^5$-pregnene-16α,17α-diol-3,20-dione 16,17-acetonide 3-ethylene ketal is obtained.

EXAMPLE 8

*6-Bromo-Δ$^5$-Pregnene-16α,17α-Diol-3,20-Dione 16,17-Acetonide 3-Ethylene Ketal*

Following the procedure of Example 1, but substituting 6β-bromo-16α,17α-dihydroxyprogesterone 16,17-acetonide for the 16α, 17α-dihydroxyprogesterone 16,17-acetonide, 6-bromo-Δ$^5$-pregnene-16α,17α-diol-3,20-dione 16,17-acetonide 3-ethylene ketal is obtained.

EXAMPLE 9

*6-Fluoro-Δ$^5$-Pregnene-16α,17α-Diol-3,20-Dione 16,17-Acetophenonide 3-Ethylene Ketal*

Following the procedure of Example 1, but substituting 6α-fluoro-16α,17α-dihydroxyprogesterone 16,17 - acetophenonide for the 16α,17α-dihydroxyprogesterone 16,17-acetonide, 6 - fluoro-Δ$^5$-pregnene-16α,17α-diol-3,20-dione 16, 17-acetophenonide 3-ethylene ketal is obtained.

EXAMPLE 10

*6-Fluoro-Δ$^5$-Pregnene-16α,17α-Diol-3,20-Dione 16,17-Acetophenonide 3-Ethylene Ketal*

Following the procedure of Example 1, but substituting 6β-fluoro-16α,17α - dihydroxyprogesterone 16,17-acetophenonide for the 16α,17α-dihydroxyprogesterone 16,17-acetonide, 6-fluoro-Δ$^5$-pregnene-16α,17α-diol-3,20 - dione 16,17-acetophenonide 3-ethylene ketal is obtained.

Similarly, 16α,17α-(2'-butylidene) 16α,17α-dihydroxy-6β-fluoroprogesterone, 16α,17α-(4'-methyl-2'-pentylidene) 16α,17α-dihydroxy-6β-chloroprogesterone, 16α,17α-cyclohexylidene 16α,17α-dihydroxy-6β-fluoroprogesterone and 16α,17α-(3'-pentylidene) 16α,17α - dihydroxy-6β-fluoroprogesterone yield their respective 3-ethylene ketal derivatives.

EXAMPLE 11

*6-Methyl-16α,17α-Dihydroxyprogesterone 16α,17α-Acetonide 3-Ethylene Ketal*

Following the procedure of Example 1, but substituting an equivalent amount of 6α-methyl-16α,17α-dihydroxyprogesterone 16,17-acetonide for the 16α,17α-dihydroxyprogesterone 16,17-acetonide, 6-methyl-16α,17α-dihydroxyprogesterone 16α,17α-acetonide 3-ethylene ketal is obtained.

EXAMPLE 12

*6-Methyl-16α,17α-Dihydroxyprogesterone 16α,17α-Acetonide 3-Ethylene Ketal*

Following the procedure of Example 1 but substituting an equivalent amount of 6β-methyl-16α,17α-dihydroxyprogesterone 16,17-acetonide for the 16α,17α-dihydroxyprogesterone 16,17-acetonide, 6-methyl-Δ$^4$-pregnene-16α,17α-diol-3,20-dione 16,17-acetonide 3-ethylene ketal is obtained.

EXAMPLE 13

*6-Methyl-Δ$^5$-Pregnene-16α,17α-Diol-3,20-Dione 16,17-Acetophenonide 3-Ethylene Ketal*

Following the procedure of Example 1 but substituting an equivalent amount of 6α-methyl-16α,17α-dihydroxyprogesterone 16,17-acetophenonide for the 16α,17α-dihydroxyprogesterone 16,17-acetonide, 6-methyl-Δ$^5$-pregnene-16α,17α-diol-3,20-dione 16,17-acetophenonide 3-ethylene ketal is obtained.

EXAMPLE 14

*3-Ethylenedioxy-16α,17α-Isopropylidenedioxy-Δ$^5$-Pregnene-20β-ol*

A solution of 100 mg. of 16α,17α-dihydroxyprogesterone 16,17-acetonide 3-monoethylene ketal and 100 mg. of lithium aluminum hydride in 15 ml. of anhydrous ether is refluxed for 2 hours and then stirred at room temperature for 18 hours. Saturated sodium sulfate solution is slowly added until a precipitate begins to form whereupon the ether layer is decanted and the precipitate washed several times with additional amounts of ether. After evaporation of the ether in vacuo the crude residue (about 92 mg.) is crystallized from acetone-hexane yielding about 74 mg. of 3-ethylenedioxy-16α,17α-isopropylidenedioxy-Δ⁵-pregnene-20β-ol, M.P. about 175–177° C.

Recrystallization from acetone-hexane gives the analytically pure ketal with the following properties: M.P. about 175–177° C.; $[\alpha]_D^{23}$ —27.5° (c., 1.1 in chlf.);

$\lambda_{max.}^{Nujol}$ 2.82μ no selective U.V. absorption.

*Anal.*—Calcd. for $C_{26}H_{40}O_5$ (432): C, 72.19; H, 9.32. Found: C, 72.42; H, 9.42.

The reduction of 16α,17α-dihydroxyprogesterone 16α,17α-acetonide 3-mono-ethylene ketal can also be accomplished with sodium borohydride in isopropanol or with lithium borohydride in dry ether as illustrated by the following examples:

EXAMPLE 15

To a solution of 25 mg. of 16α,17α-dihydroxyprogesterone 16α,17α-acetonide 3-monoethylene ketal in 10 ml. of isopropanol is added 100 mg. of sodium borohydride and the resulting mixture is refluxed for 18 hours. After cooling, aqueous methanol is added to destroy the excess borohydride and the reaction mixture is concentrated in vacuo to remove most of the alcohol. Dilution with water produces a precipitate which is filtered, washed well with water and dried in vacuo. An infrared spectrum of this material proved it to be identical with the 20β-hydroxy compound obtained in Example 14.

EXAMPLE 16

A solution of 25 mg. of 16α,17α-dihydroxyprogesterone 16α,17α-acetonide 3-monoethylene ketal and 50 mg. of lithium borohydride in 10 ml. of dry ether is stirred at room temperature for 18 hours. Water is added to destroy the excess borohydride and the ether is removed in vacuo. Crystalline material separates, which is filtered, washed well with water and dried in vacuo. An infrared spectrum of the dried material is identical with that obtained in Example 14.

EXAMPLE 17

*3-Ethylenedioxy-16α,17α-(α-Phenyl-β-Methyl)-Methylenedioxy-Δ⁵-Pregnene-20β-ol*

A solution of 25 mg. of 16α,17α-dihydroxyprogesterone 16,17-acetophenonide 3-ethylene ketal in 10 ml. of isopropanol is refluxed for 18 hours. Aqueous methanol is added to the cooled reaction mixture to destroy the excess borohydride and the alcohol is then removed by evaporation in vacuo. Dilution with more water gives a crystalline precipitate, which is filtered, washed well with water and dried in vacuo. An infrared spectrum of the precipitate indicates complete reduction of the 20-ketone. Crystallization from acetone-hexane gives the analytically pure derivative of Δ⁵-pregnene-16α,17α,20β-triol-3-one 16,17-acetophenonide 3-ethylene ketal (α-phenyl isomer) with the following properties: M.P. about 221–223° C.; $[\alpha]_D^{23}$ —37° (c., .9 in chlf.);

$\lambda_{max.}^{Nujol}$ 2.79, 13.11 and 14.26μ no selective U.V. absorption.

*Anal.*—Calcd. for $C_{31}H_{42}O_5$ (494): C. 75.27; H, 8.56. Found: C, 75.03; H, 8.60.

The same product is obtained when the reaction is conducted at room temperature for 18 hours. 16α,17α-dihydroxyprogesterone 16α,17-acetophenonide 3-ethylene ketal is also completely reduced by lithium borohydride in dry ether at room temperature for 18 hours.

EXAMPLE 18

*16,17-Chloral Derivative of Δ⁴-Pregnene-16α,17α,20β-Triol-3-One 3-Ethylene Ketal*

Following the procedure of Example 14 but substituting an equivalent amount of the 16α,17α-chloral derivative of Δ⁴-pregnene-16α,17α-diol-3,20-dione 3-ethylene ketal for the 16α,17α-dihydroxyprogesterone 16,17-acetonide 3-ethylene ketal, the 16,17-chloral derivative of Δ⁴-pregnene-16α,17α,20β-triol-3-one 3-ethylene ketal is obtained.

EXAMPLE 19

*16,17-Dicyclopropyl Ketone Derivative of Δ⁴-Pregnene-16α,17α,20β-Triol-3-One 3-Ethylene Ketal*

Following the procedure of Example 14 but substituting an equivalent amount of the 16,17-dicyclopropyl ketone derivative of 16α,17α-dihydroxyprogesterone 3-ethylene ketal for the 16α,17α-dihydroxyprogesterone 16,17-acetonide 3-ethylene ketal, the 16,17-dicyclopropyl ketone derivative of Δ⁴-pregnene-16α,17α,20β-triol-3-one 3-ethylene ketal is obtained.

Similarly, the methylisobutyl ketone derivative, the cyclopropyl phenyl ketone derivative, the cyclohexyl methyl ketone derivative, the 1,1,1-trifluoroacetone derivative, the heptafluorobutanal derivative, the p-chloroacetophenone derivative, the p-nitroacetophenone derivative, the benzaldehyde derivative, the furfural derivative, the benzophenone derivative and the 2-acetylfuran derivative of 16α,17α-dihydroxyprogesterone 3-ethylene ketal, yield the methylisobutyl ketone, the cyclopropylphenyl ketone, the cyclohexyl methyl ketone, the 1,1,1-trifluoroacetonide, the heptafluorobutanal, the p-chloroacetophenone, the p-nitroacetophenone, the benzaldehyde, the furfural, the benzophenone and the 2-acetylfuran derivatives of Δ⁴-pregnene-16α,17α,20β-triol-3,20-dione 3-ethylene ketal, respectively.

EXAMPLE 20

*6-Chloro-Δ⁵-Pregnene-16α,17α,20β-Triol-3-One 16,17-Acetonide 3-Ethylene Ketal*

Following the procedure of Example 14 but substituting an equivalent amount of 6β-chloro-16α,17α-dihydroxyprogesterone 16,17-acetonide 3-ethylene ketal for the 16α,17α-dihydroxyprogesterone 16,17-acetonide 3-ethylene ketal, 6-chloro-Δ⁵-pregnene-16α,17α,20β-triol-3-one 16,17-acetonide 3-ethylene ketal is obtained.

EXAMPLE 21

*6-Fluoro-Δ⁵-Pregnene-16α,17α,20β-Triol-3-One 16,17-Acetonide 3-Ethylene Ketal*

Following the procedure of Example 14 but substituting an equivalent amount of 6-fluoro-16α,17α-dihydroxyprogesterone 16,17-acetonide 3-ethylene ketal for the 16α,17α-dihydroxyprogesterone 16,17-acetonide 3-ethylene ketal, 6-fluoro-Δ⁵-pregnene-16α,17α,20β-triol-3-one 16,17-acetonide 3-ethylene ketal is obtained.

EXAMPLE 22

*6-Bromo-Δ⁵-Pregnene-16α,17α,20β-Triol-3-One 16,17-Acetonide 3-Ethylene Ketal*

Following the procedure of Example 14 but substituting an equivalent amount of 6-bromo-16α,17α-dihydroxyprogesterone 16,17-acetonide 3-ethylene ketal for the 16α,17α-dihydroxyprogesterone 16,17-acetonide 3-ethylene ketal, 6-bromo-Δ⁵-pregnene-16α,17α,20β-triol-3-one 16,17-acetonide 3-ethylene ketal is obtained.

EXAMPLE 23

*6-Fluoro-Δ⁵-Pregnene-16α,17α,20β-Triol-3-One 16,17-Acetophenonide 3-Ethylene Ketal*

Following the procedure of Example 14 but substituting an equivalent amount of 6-fluoro-16α,17α-dihydroxyprogesterone 16,17-acetophenonide 3-ethylene ketal for the 16α,17α-dihydroxyprogesterone 16,17-acetonide 3-ethylene ketal, 6 - fluoro-Δ⁵-pregnene-16α,17α,20β-triol-3-one 16,17-acetophenonide 3-ethylene ketal is obtained.

Similarly, the 3-ethylene ketals of 16α,17α-(2'-butylidene) 16α,17α-dihydroxy-6-fluoroprogesterone, 16α,17α-(4' - methyl-2'-pentylidene) 16α,17α-dihydroxy-6-chloroprogesterone, 16α,17α-cyclohexylidene 16α,17α-dihydroxy-6 - fluoroprogesterone and 16α,17α(3'-pentylidene) 16α,17α-dihydroxy-6-fluoroprogesterone yield their respective 20β-hydroxy derivatives.

EXAMPLE 24

*6-Methyl-Δ⁵-Pregnene-16α,17α,20β-Triol-3-One 16,17-Acetonide 3-Ethylene Ketal*

Following the procedure of Example 14 but substituting an equivalent amount of 6-methyl-16α,17α-dihydroxyprogesterone 16,17-acetonide 3-ethylene ketal for the 16α,17α - dihydroxyprogesterone 16,17-acetonide 3-ethylene ketal, 6-methyl-Δ⁵-pregnene-16α,17α,20β-triol-3-one 16,17-acetonide 3-ethylene ketal is obtained.

EXAMPLE 25

*6-Methyl-Δ⁵-Pregnene-16α,71α,20β-Triol-3-One 16,17-Acetophenonide 3-Ethylene Ketal*

Following the procedure of Example 14 but substituting an equivalent amount of 6-methyl-16α,17α-dihydroxyprogesterone 16,17-acetophenonide 3-ethylene ketal for the 16α,17α - dihydroxyprogesterone 16,17-acetonide 3-ethylene ketal, 6-methyl-Δ⁵-pregnene-16α,17α,20β-triol-3-one 16,17-acetophenonide 3-ethylene ketal is obtained.

EXAMPLE 26

*Δ⁴-Pregnene-16α,17α,20β-Triol-3-One 16α,17α-Acetonide*

A solution of 90 mg. of 3-ethylenedioxy-16α,17α-isopropylidenedioxy-Δ⁵-pregnene-20β-ol in 10 ml. of methanol and 0.34 ml. of 8% sulfuric acid (w./v.) is refluxed for 30 minutes. Water is added to the cooled mixture, the bulk of the methanol removed in vacuo, and the resulting precipitate filtered, washed with water and dried in vacuo. Crystallization from acetone-hexane yields Δ⁴-pregnene-16α,17α,20β-triol-3-one 16α,17α-acetonide about 50 mg. (62% yield), melting at about 229–231°. Recrystallization from acetone-hexane gives an analytically pure sample of product with the following properties: M.P. about 234–235°; $[\alpha]_D^{23}$ +79° (c., 1.0 in chlf.)

$\lambda_{max}^{Nujol}$ 2.95 6.00 and 6.19μ; $\lambda_{max}^{alc.}$ 240 mμ (ε=19,000)

*Anal.*—Calcd. for $C_{24}H_{36}O_4$ (388): C, 74.19; H, 9.34. Found: C, 74.44; H, 9.26.

EXAMPLE 27

*Δ⁴-Pregnene-16α,17α,20β-Triol-3-One 16α,17α-Acetophenonide*

A solution of 90 mg. of Δ⁵-pregnene-16α,17α,20β-triol-3-one 16α,17α-acetophenonide 3-ethylene ketal in 20 ml. of methanol and 0.68 ml. of 8% (w./v.) of sulfuric acid is refluxed for 30 minutes. The acid is neutralized by the addition of bicarbonate solution and most of the methanol is evaporated in vacuo. Dilution with water yields a crystalline precipitate which is filtered, washed and dried in vacuo. This material possesses an ultraviolet spectrum indicating complete hydrolysis.

$[\lambda_{max} 240$ mμ (ε=15,750)]

Crystallization from 95% ethanol gives the analytically pure Δ⁴-pregnene-16α,17α,20β-triol-3-one 16α,17α-acetophenonide (α-phenyl isomer) possessing the following physical properties: M.P. about 193–195°; $[\alpha]_D^{23}$ +17° (c., 0.9 in chlf.)

$\lambda_{max}^{alc.}$ 240 mμ (ε=15,750); $\lambda_{max}^{Nujol}$ 2.96, 6.05, 6.20, 12.92, 13.02 and 14.16μ

*Anal.*—Calcd. for $C_{29}H_{38}O_4$ (450): C, 77.30; H, 8.50. Found: C, 77.45; H, 8.57.

EXAMPLE 28

*16,17-Chloral Derivative of Δ⁴-Pregnene-16α,17α,20β-Triol-3-One*

Following the procedure of Example 26, but substituting an equivalent amount of the 16,17-chloral derivative of Δ⁴-pregnene-16α,17α,20β-triol-3-one 3-ethylene ketal for the 3-ethylenedioxy-16α,17α-isopropylidenedioxy-Δ⁵-pregnene-20β-ol, the 16,17-chloral derivative of Δ⁴-pregnene-16α,17α,20β-triol-3-one is obtained.

EXAMPLE 29

*16,17-Dicyclopropyl Ketone Derivative of Δ⁴-Pregnene-16α,17α,20β-Triol-3-One*

Following the procedure of Example 26, but substituting an equivalent amount of the 16,17-dicyclopropyl ketone derivative of Δ⁴-pregnene-16α,17α,20β-triol-3-one 3-ethylene ketal for the 3-ethylenedioxy-16α,17α-isopropylidenedioxy-Δ⁵-pregnene-20β-ol, the 16,17-dicyclopropyl ketone derivative of Δ⁴-pregnene-16α,17α,20β-triol-3-one is obtained.

Similarly, the methylisobutyl ketone derivative, the cyclopropyl phenyl ketone derivative, the cyclohexyl methyl ketone derivative, the 1,1,1-trifluoroacetone derivative, the heptafluorobutanal derivative, the p-chloroacetophenone derivative, the p-nitroacetophenone derivative, the benzaldehyde derivative, the furfural derivative, the benzophenone derivative and the 2-acetylfuran derivative of Δ⁴-pregnene-16α,17α,20β-triol-3-one 3-ethylene ketal, yield the methylisobutyl ketone, the cyclopropyl phenyl ketone, the cyclohexyl methyl ketone, the 1,1,1-trifluoroacetonide, the heptafluorobutanal, the p-chloroacetophenone, the p-nitroacetophenone, the benzaldehyde, the furfural, the benzophenone and the 2-acetyl furan derivatives of Δ⁴-pregnene-16α,17α,20β-triol-3-one, respectively.

EXAMPLE 30

*6α-Chloro-Δ⁴-Pregnene-16α,17α,20β-Triol-3-One 16,17-Acetonide*

Following the procedure of Example 26, but substituting an equivalent amount of 6-chloro-Δ⁵-pregnene-16α,17α,20β-triol-3-one 16,17-acetonide 3-ethylene ketal for the 3-ethylenedioxy-16α,17α-isopropylidenedioxy-Δ⁵-pregnene - 20β-ol, 6α-chloro-Δ⁴-pregnene-16α,17α,20β-triol-3-one 16,17-acetonide is obtained.

EXAMPLE 31

*6α-Fluoro-Δ⁴-Pregnene-16α,17α,20β-Triol-3-One 16,17-Acetonide*

Following the procedure of Example 26, but substituting an equivalent amount of 6-fluoro-Δ⁵-pregnene-16α,17α,20β-triol-3-one 16,17-acetonide 3-ethylene ketal for the 3-ethylenedioxy-16α,17α-isopropylidenedioxy-Δ⁵-pregnene - 20β - ol, 6α - fluoro - Δ⁴ - pregnene - 16α,17α,20β-triol-3-one 16,17-acetonide is obtained.

EXAMPLE 32

*6α-Bromo-Δ⁴-Pregnene-16α,17α,20β-Triol-3-One 16,17-Acetonide*

Following the procedure of Example 26, but substituting an equivalent amount of 6-bromo-Δ⁵-pregnene-16α,17α,20β-triol-3-one 16,17-acetonide 3-ethylene ketal for the 3 - ethylenedioxy - 16α,17α - isopropylidenedioxy-Δ⁵ - pregnene - 20β - ol, 6α - bromo - Δ⁴ - pregnene - 16α,17α,20β-triol-3-one 16,17-acetonide is obtained.

EXAMPLE 33

*6α-Fluoro-Δ4-Pregnene-16α,17α,20β-Triol-3-One 16,17-Acetophenonide*

Following the procedure of Example 26, but substituting an equivalent amount of 6-fluoro-Δ⁵-pregnene-16α,17α,20β-triol-3-one 16,17-acetophenonide 3-ethylene ketal for the 3-ethylenedioxy-16α,17α-isopropylidenedioxy-Δ⁵- pregnene - 20β - ol, 6α - fluoro - Δ⁴ - pregnene - 16α,17α,20β-triol-3-one 16,17-acetophenonide is obtained.

EXAMPLE 34

*6α-Methyl-Δ⁴-Pregnene-16α,17α,20β-Triol-3-One 16,17-Acetonide*

Following the procedure of Example 26, but substituting an equivalent amount of 6-methyl-Δ⁵-pregnene-16α,17α,20β-triol-3-one 16,17-acetonide 3-ethylene ketal for the 3 - ethylenedioxy - 16α,17α - isopropylidenedioxy-Δ⁵-pregnene-20β-ol, 6α-methyl-Δ⁴-pregnene-16α,17α,20β-triol-3-one 16,17-acetonide is obtained.

EXAMPLE 35

*6α-Methyl-Δ⁴-Pregnene-16α,17α,20β-Triol-3-One 16,17-Acetophenonide*

Following the procedure of Example 26 but substituting an equivalent amount of 6-methyl-Δ⁵-pregnene-16α,17α,20β-triol-3-one 16,17-acetophenonide 3-ethylene ketal for the 3-ethylenedioxy-16α,17α-isopropylidenedioxy-Δ⁵-pregnene - 20β - ol, 6α - fluoro - Δ⁴ - pregnene - 16α,17α,20β-triol-3-one 16,17-acetophenonide is obtained.

EXAMPLE 36

*Δ⁴-Pregnene-16α,17α,20β-Triol-3-One 16α,17α-Acetonide 20-Acetate*

80 mg. of Δ⁴-pregnene-16α,17α,20β-triol-3-one 16α,17α-acetonide is dissolved in 5 ml. of dry pyridine and 2.5 ml. of acetic anhydride and the mixture is allowed to stand at room temperature for 18 hours. Ice is then added to the reaction mixture and the resulting precipitate is filtered, washed well with water and dried in vacuo. Crystallization from acetonehexane yields the pure 20β-acetate with the following properties: M.P. about 243–245°; $[\alpha]_D^{23}$ +104° (c., 0.8 in chlf.)

$\lambda_{max}^{Nujol}$ 5.73, 5.94, 6.17 and 8.00μ $\Delta M_D^{(20-acetate-20-ol)} = +140°$ Similarly, if other acylating agents are substituted for the acetic anhydride in the above procedure, the corresponding 20-esters are formed. Thus, propionic anhydride yields the 20β-propionate and benzoyl chloride yields the 20β-benzoate. Moreover, if other acetals and ketals are substituted for the ⁴Δ-pregnene-16α,17α,20β-triol-3-one 16,17-acetonide in the above procedure, the corresponding 20β-acetates are obtained.

The following examples illustrate the preparation of the final compounds of this invention by the second alternative method. In these examples 16α,17α-dihydroxyprogesterone 16,17-acetophenonide is employed as the starting steroid. The method is, however, equally applicable for converting any of the starting steroids of this invention to their respective final products.

EXAMPLE 37

*16α,17α(α-Phenyl-β-Methyl)-Methylenedioxy-Δ⁴-Pregnene-3β,20β-Diol*

A solution of 50 mg. of 16α,17α-dihydroxyprogesterone 16,17-acetophenonide (α-phenyl isomer) and 100 mg. of lithium aluminum hydride in 5 ml. of freshly distilled tetrahydrofuran is refluxed for 19 hours. The reaction is stopped by the addition of saturated sodium sulfate solution, filtered by gravity and the precipitate washed thoroughly with ether. Evaporation of the ether-tetrahydrofuran solution gives about 55 mg. of a crude residue which after two crystallizations from methanol gives pure 3β,20β-diol having the following properties: M.P. about 174–175°; $[\alpha]_D^{23}$ −7.8° (c., .69 in chlf.).

EXAMPLE 38

*16α,17α-(α-Phenyl-β-Methyl)-Methylenedioxy-Δ⁴-Pregnene-20β-Ol-3-One*

To a solution of 12 mg. of 16α,17α-(α-phenyl-β-methyl)-methylenedioxy-Δ⁴-pregnene-3β,20β-diol in 2 ml. of chloroform is added 120 mg. of active manganese dioxide prepared according to Attenburrow, et al., J. Chem. Soc., 1094 (1952). The suspension is shaken at room temperature for 48 hours, filtered and the manganese dioxide washed thoroughly with chloroform. Evaporation of the chloroform solution to dryness afforded pure product melting at about 187–188°, identical in all respects with the compound prepared in Example 34.

EXAMPLE 39

*16α,17α-(α-Methyl-β-Phenyl)-Methylenedioxy-Δ⁴-Pregnene-3β,20β-Diol*

Fifty milligrams of 16α,17α-dihydroxyprogesterone acetophenonide (β-penyl isomer) is reduced with lithium aluminum hydride in tetrahydrofuran as described in Example 37 for the α-phenyl isomer. The resulting amorphous 3β,20β-diol is used in Example 40 without further purification.

EXAMPLE 40

*16α,17α-(α-Methyl-β-Phenyl)-Methylenedioxy-Δ⁴-Pregnene-20β-Ol-3-One*

The crude 3β,20β-diol obtained in Example 39 is oxidized with active manganese dioxide as follows: To a solution of 53.5 mg. of the crude steroid in 2.5 ml. of chloroform is added 500 mg. of manganese dioxide and the mixture shaken for 48 hours at room temperature. The mixture is filtered, and the precipitate washed thoroughly with hot chloroform. The chloroform solution on evaporation in vacuo furnishes about 36 mg. of 16α,17α - (α - methyl - β - phenyl)methylenedioxy - Δ⁴ - pregnene-20β-ol-3-one, which on recrystallization from methanol furnishes analytically pure material possessing the following properties: M.P. about 290–291°; $[\alpha]_D^{23}$ +67° (c., 1.0 in chlf.)

$\lambda_{max}^{alc.}$ 241 mμ (ε=17,000); $\lambda_{max}^{Nujol}$ 2.90, 6.00, 6.18, 12.90, 14.12μ

*Analysis.*—Calcd. for $C_{29}H_{38}O_4$ (450.59); C, 77.30; H, 8.50. Found: C, 77.56; H, 8.43.

This invention may be variously otherwise embodied within the scope of the appended claims.

What is claimed is:

1. A compound of the formula

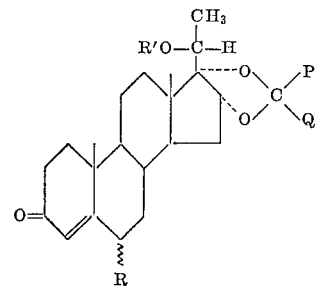

wherein R is selected from the group consisting of hydrogen, chlorine, fluorine and lower alkyl; R' is selected from the group consisting of hydrogen and the acyl radical of a hydrocarbon caroxylic acid of less than ten carbon atoms; P is selected from the group consisting of hydrogen, lower alkyl, halo lower alkyl, monocyclic cycloalkyl, monocyclic cycloalkyl lower alkyl, monocyclic aryl, monocyclic aryl lower alkyl, monocyclic heterocyclic and monocyclic heterocyclic lower alkyl; Q is selected from the group consisting of lower alkyl, halo lower alkyl, monocyclic cycloakyl, monocyclic cycloalkyl lower alkyl, monocyclic aryl, monocyclic aryl lower alkyl, monocyclic heterocyclic and monocyclic heterocyclic lower alkyl; and together with the carbon to which they are joined P and Q is selected from the group consisting of monocyclic cycloalkyl and monocyclic heterocyclic.

2. Δ⁴-pregnene-16α,17α,20β-triol-3-one 16,17-acetonide.

3. Δ⁴-pregnene-16α,17α,20β-triol-3-one 16,17-acetophenonide.

4. 6-chloro-Δ⁴-pregnene-16α,17α,20β-triol-3-one 16-17-acetonide.

5. 6-methyl-Δ⁴-pregnene-16α,17α,20β-triol-3-one 16,17-acetonide.

6. A compound of the formula

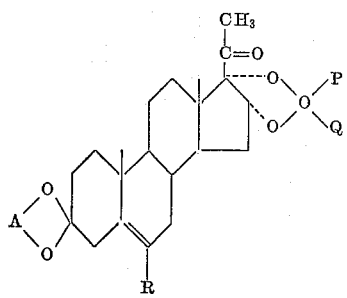

wherein R is selected from the group consisting of hydrogen, chlorine, fluorine and lower alkyl; A is lower alkylene; P is selected from the group consisting of hydrogen, lower alkyl, halo lower alkyl, monocyclic cycloalkyl, moncyclic cycloalkyl lower alkyl, monocyclic aryl, monocyclic aryl lower alkyl, monocyclic heterocyclic and monocyclic heterocyclic lower alkyl; Q is selected from the group consisting of lower alkyl, halo lower alkyl, monocyclic cycloalkyl, monocyclic cycloalkyl lower alkyl, monocyclic aryl, monocyclic aryl lower alkyl, monocyclic heteroyclic and monocyclic heterocyclic lower alkyl; and together with the carbon to which they are joined P and Q is selected from the group consisting of monocyclic cycloalkyl and monocyclic heterocyclic.

7. 3-ethylenedioxy - 16α,17α - isopropylidenedioxy - Δ⁵-pregnene-20-one.

8. 3-ethylenedioxy - 16α,17α - (α-phenylethylenedioxy)-Δ⁵-pregnene-20-one.

9. A compound of the formula

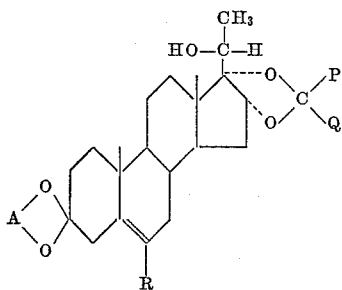

wherein R is selected from the group consisting of hydrogen, chlorine, fluorine and lower alkyl; A is lower alkylene; P is selected from the group consisting of hydrogen, lower alkyl, halo lower alkyl, monocyclic cycloalkyl, monocyclic cycloalkyl lower alkyl, monocyclic aryl, monocyclic aryl lower alkyl, monocyclic heterocyclic and monocyclic heterocyclic lower alkyl; Q is selected from the group consisting of lower alkyl, halo lower alkyl, monocyclic cycloalkyl, monocyclic cycloalkyl lower alkyl, monocyclic aryl, monocyclic aryl lower alkyl, monocyclic heterocyclic and monocyclic heterocyclic lower alkyl; and together with the carbon to which they are joined P and Q is selected from the group consisting of monocyclic cycloalkyl and monocyclic heterocyclic.

10. 3-ethylenedioxy - 16α,17α - isopropylidenedioxy -Δ⁵-pregnene-20β-ol.

11. 3-ethylenedioxy-16α,17α-(α - phenylethylenedioxy)-Δ⁵-pregnene-20β-ol.

12. A compound of the formula

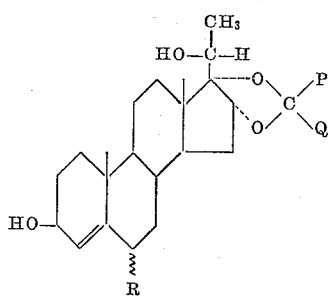

wherein R is selected from the group consisting of hydrogen, chlorine, fluorine and lower alkyl; P is selected from the group consisting of hydrogen, lower alkyl, halo lower alkyl, monocyclic cycloalkyl, monocyclic cycloalkyl lower alkyl, monocyclic aryl, monocyclic aryl lower alkyl, monocyclic heterocyclic and monocyclic heterocyclic lower alkyl; Q is selected from the group consisting of lower alkyl, halo lower alkyl, monocyclic cycloalkyl, monocyclic cycloalkyl lower alkyl, monocyclic aryl, monocyclic aryl lower alkyl, monocyclic heterocyclic and monocyclic heterocyclic lower alkyl; and together with the carbon to which they are joined P and Q is selected from the group consisting of monocyclic cycloalkyl and monocyclic heterocyclic.

13. 16α,17α-isopropylidenedioxy-Δ⁴-pregnene - 3β,20β - diol.

14. 16α,17α-(α-phenylethylenedioxy)-Δ⁴-pregnene · 3β,20β-diol.

References Cited in the file of this patent
UNITED STATES PATENTS

| | | |
|---|---|---|
| 2,911,403 | Sondheimer et al. | Nov. 3, 1959 |
| 2,931,806 | Sarett | Apr. 5, 1960 |
| 2,932,638 | Gould et al. | Apr. 12, 1960 |

OTHER REFERENCES

Fieser et al.: Steroids, Rheinhold Publishing Corp., June 25, 1959, page 568.

Mazur et al.: Tetrahedron, 1959, vol. 7, pages 130–137.

Zander et al.: The Journal of Clinical Endrocrinology and Metabolism, vol. XVIII, No. 4, April 1958, pages 337–353.

Fried et al. (I): Chemistry and Industry, Apr. 15, 1961, pages 465–466.

Fried et al. (II): Chemistry and Industry, Apr. 15, 1961, pages 466–468.

UNITED STATES PATENT OFFICE
CERTIFICATE OF CORRECTION

Patent No. 3,134,770                                            May 26, 1964

Josef Fried

It is hereby certified that error appears in the above numbered patent requiring correction and that the said Letters Patent should read as corrected below.

Column 1, line 47, for "posses" read -- possess --; column 5, line 12, for "Choral", in italics, read -- Chloral --, in italics; lines 30 and 31, for "17a-diol 3-ethylene ketal" read -- 17α-diol-3,20-dione 3-ethylene ketal --; same column 5, lines 34 and 35, after "derivative," insert -- the --; column 9, line 22, for "71α", in italics, read -- 17α --, in italics; column 10, line 69, for "Δ4-, in italics, read -- $\Delta^4$- --, in italics; column 11, line 43, for "$^4\Delta$-" read -- $\Delta^4$- --; column 12, line 13, for "(β-penyl isomer)" read -- (β-phenyl isomer) --; line 60, for "caroxylic" read -- carboxylic --; column 13, lines 6 to 17, the upper right-hand portion of the formula should appear as shown below instead of as in the patent:

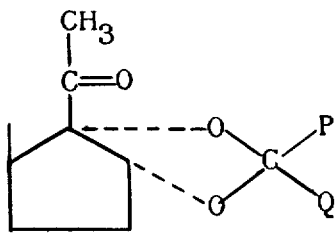

Signed and sealed this 30th day of March 1965.

(SEAL)
Attest:

ERNEST W. SWIDER                                  EDWARD J. BRENNER
Attesting Officer                                    Commissioner of Patents